United States Patent [19]
Ambrose et al.

[11] 3,797,530
[45] Mar. 19, 1974

[54] HOSE PIPES

[75] Inventors: John Ambrose; Edmund J. Shephard, both of Brimsby, England

[73] Assignee: Dunlop Holdings Limited, London, England

[22] Filed: Apr. 12, 1971

[21] Appl. No.: 133,011

[30] Foreign Application Priority Data
  Apr. 15, 1971  Great Britain...................... 17855/71

[52] U.S. Cl. ................................ 138/137, 138/153
[51] Int. Cl. ............................................ F16l 11/00
[58] Field of Search ........... 138/109, 127, 129, 137, 138/131, 153, 138, 124, 178, DIG. 9

[56] References Cited
UNITED STATES PATENTS
3,119,415  1/1964  Galloway et al. ................ 138/109 X
3,154,329  10/1964  Skinner........................... 138/153 X
3,548,884  12/1970  Ambrose......................... 138/129 X Primary Examiner—Martin P. Schwadron
Assistant Examiner—David R. Matthews
Attorney, Agent, or Firm—Stevens, Davis, Miller & Mosher

[57]  ABSTRACT

A flexible hosepipe for carrying slurry or solid particles provided with a lining comprising a first layer of hard, abrasion and cut-resistant rubber and a second cushioning layer of soft rubber behind the first layer. The hosepipe may be self floating and each length may have end fittings connected during the assembly of the hose, of which the following is a specification.

7 Claims, 4 Drawing Figures

HOSE PIPES

This invention relates to hosepipes and in particular to flexible hosepipe for carrying slurry or solid particles.

Such hosepipe is used for dredging either to provide navigation channels, for the recovery of material, for example, sand or gravel, from a water covered surface, for use in concrete manufacture or the like.

Internal abrasion severely limits the use of known pipes for this application and frequent renewal is required. Furthermore, in the case where material is pumped through the pipe to the shore from a dredger, such as in sand or gravel recovery, the wave height in which operations may be carried out is severely limited with conventional pipelines. These comprise a series of steel pipes interconnected by steel ball joints at intervals. The joints allow a movement of up to about 22° and thus the smallest curvature of an assembled pipeline is of the order of 200 feet. The assembly is connected at intervals to buoys and thus is both complex or expensive without allowing use in waves of more than about 12 inches amplitude.

According to one aspect of the present invention a flexible hosepipe comprises a first inner layer of hard, abrasion-resistant elastomeric material and at least one second inner layer disposed radially outwardly of the first layer said second layer being of relatively soft resilient elastomeric material whereby the second layer cushions impacts on the first layer.

The invention also provides a hosepipe as above in which spaced-apart rings of cured resinous material provide resistance to bursting or crushing while providing a hosepipe which is flexible. The hosepipe may also be self-floating for use on water without the necessity for additional buoyancy devices.

Another aspect of the invention provides lengths of hosepipe of the above types each length having end fittings to allow the assembly into a long hoseline. Lining tubes may be provided for the end fittings the lining tubes being replaceable and which may be of abrasion-resistant material.

Some embodiments of the invention will now be described, by way of example only, in conjunction with the accompanying drawings in which:

FIG. 1 shows the structure of a 24 inch nominal bore self-floating hose used for under-water dredging. The hose is built on a steel mandrel from which it is removed after final vulcanization and trimming.

Figure 1:
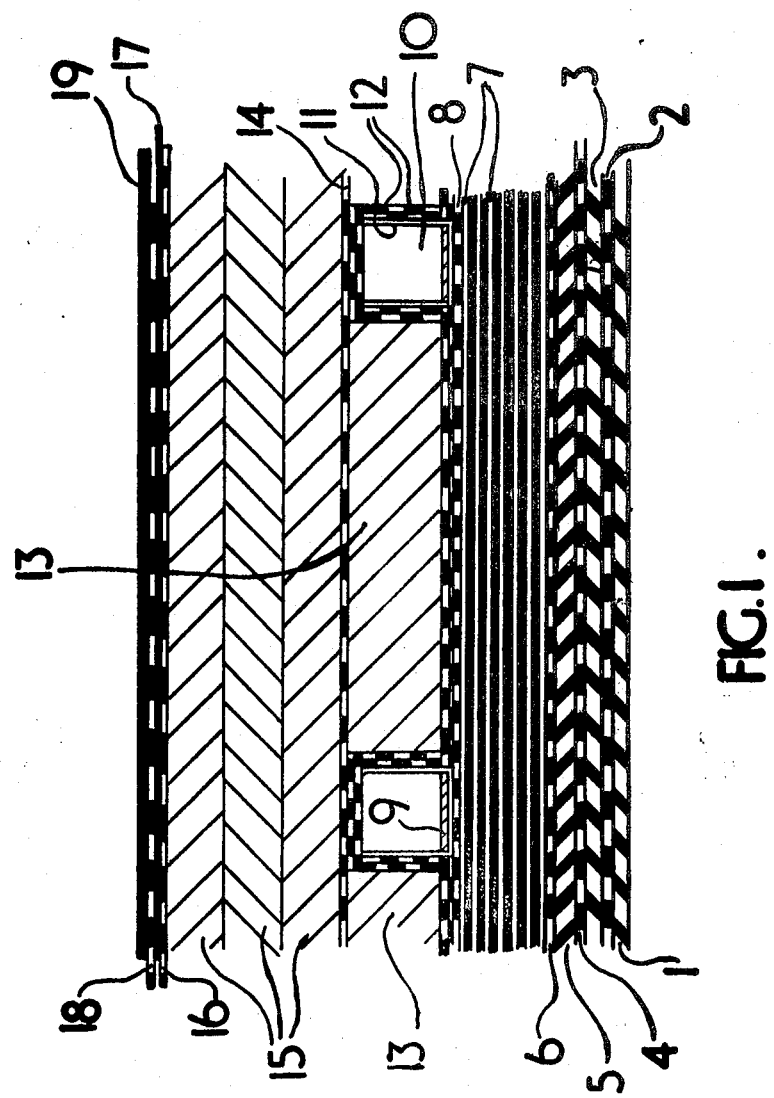
FIG. 1 is a section of a hose wall of self-floating construction.

A first layer of approximately ¼ inch of uncured, tough, abrasion and cut resistant rubber of relatively high hardness (approximately 75° shore) is wrapped around the mandrel to form a first inner lining layer 1. Over this is laid a breaker layer 2 of rubberized fabric followed by a further ¼ inch layer 3 of rubber as used for the first inner layer and then a further breaker layer 4 of rubberized fabric. A second ¼ inch inner lining layer 5 of uncured natural rubber or a natural/synthetic rubber mixture (approximately 45°–50° shore hardness) is then applied to act as a soft, highly resilient cushioning layer. A final breaker layer 6 of rubberized fabric is then applied to complete the lining of the hose.

Several layers 7 of textile reinforcement and uncured rubber filler are then applied. Each layer of textile reinforcement is pre-coated with uncured rubber so that the layers bond together to give a homogeneous region of reinforcement.

Another fabric breaker layer 8 is applied to form a base for ring reinforcement 11 which each comprise two half-ring sections of U-shaped cross-section aluminium alloy. Each pair of sections is positioned around the hose to form a continuous annular U-shaped channel and a thin steel strip retaining strap 9 is fastened around the sections to hold them in position. The reinforcement rings 11 are positioned at seven inch intervals along the length of the hosepipe to provide strength and yet flexibility in the final assembly. The channels 11 are fitted with uncured resinous material 10 containing reinforcing filaments of glass fiber.

Two fabric breaker plies 12 are applied over the rings 11 and the spaces between the rings are filled with micro-cellular sponge 13. A fabric breaker layer 14 and three layers 15 of micro-cellular sponge to provide buoyancy are applied followed by the outer covering layers.

The outer covering layers comprise a fabric breaker layer 16, a sub cover layer 17 of uncured rubber, a further fabric breaker layer 18 and an outer covering layer 19 of uncured rubber.

The assembly is then wrapped tightly with a wet nylon tape to compact the assembly and heated in a steam oven simultaneously to vulcanize the uncured rubber and cure the resin of the reinforcing rings 10. The nylon tape is then removed, the hose removed from the mandrel, trimmed and finally tested.

The resultant hose has an inbuilt self-buoyancy due to the micro-cellular layers 13 and 15 and the spacing of the rings 11 allows the hose to be quite sharply curved in use. The inner lining layers 1 and 2 resist abrasion and cushion shock loads, respectively, as the material of the first lining layer 1 is hard and the material of the second lining layer 2 is relatively soft and resilient.

The material of the inner lining layers 1 and 2 are chosen to suit the materials to be pumped through the hosepipe. In particular the hardness and resistance to cutting of the first layer 1 may be varied dependent on the sharpness of the material fragments, the choice being made to give the longest hose life possible.

The breaker and reinforcement plies can be of textile either natural or synthetic and/or of metal cords including fine wire metal cords. The textile or metal cords may be in the form of a woven fabric or in other form.

Figure 2:
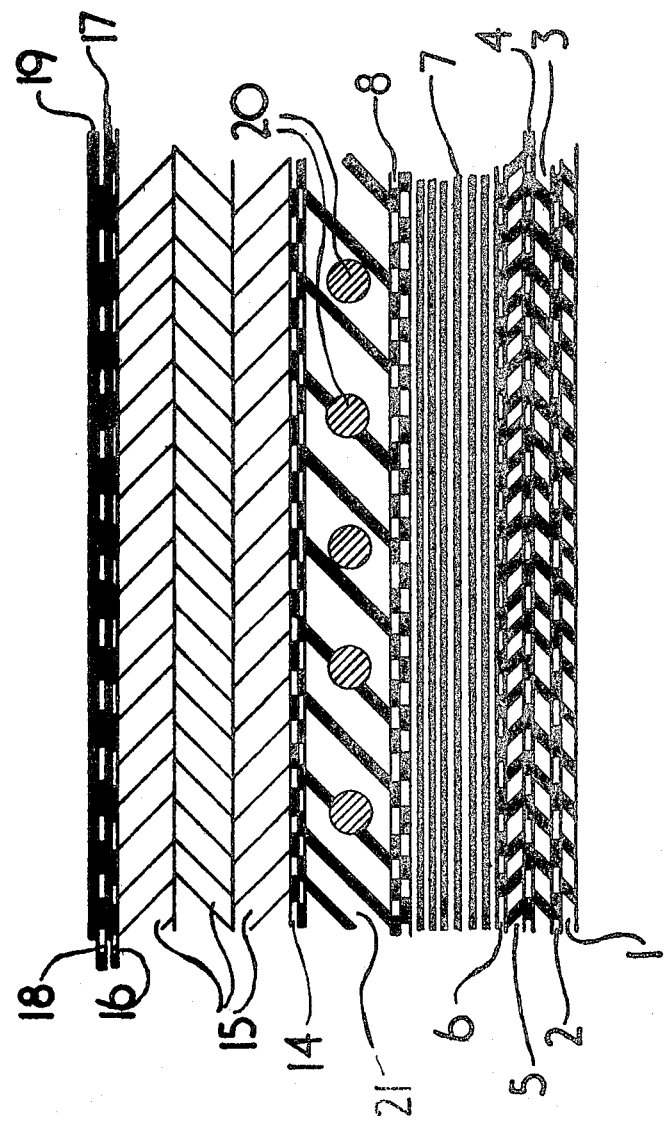
FIG. 2 is a section of a hose showing an alternative reinforcement structure.

The hosepipe shown in FIG. 2 is basically constructed as the hose described above except that no resin reinforcement rings are used. Instead a helical winding 20 of ¼ inch diameter steel wire is wound over the hose lining assembly. The wire is wound so that adjacent wires are spaced at 3 inch intervals to ensure the assembly is flexible and the wires 20 are embedded in uncured rubber filler material 21. The fabric breaker plies 8 and 14 on either side of this reinforcement layer each comprise two layers of rubber impregnated fabric.

Figure 3:
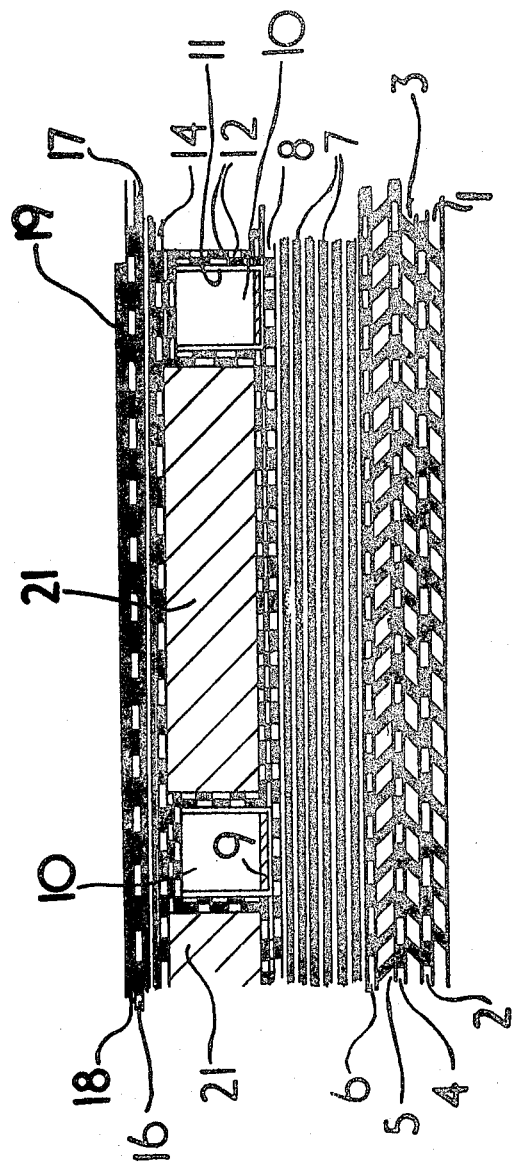
FIG. 3 is a section of a non-floating hose.

The hosepipe shown in FIG. 3 is similar to that described in the first embodiment except for the lack of micro-cellular sponge layers. Instead the spaces between the rings are filled by filler material 21 of uncured rubber and the outer covering layers are applied over the fabric breaker 14. The resultant hose is not self-floating.

Figure 4:
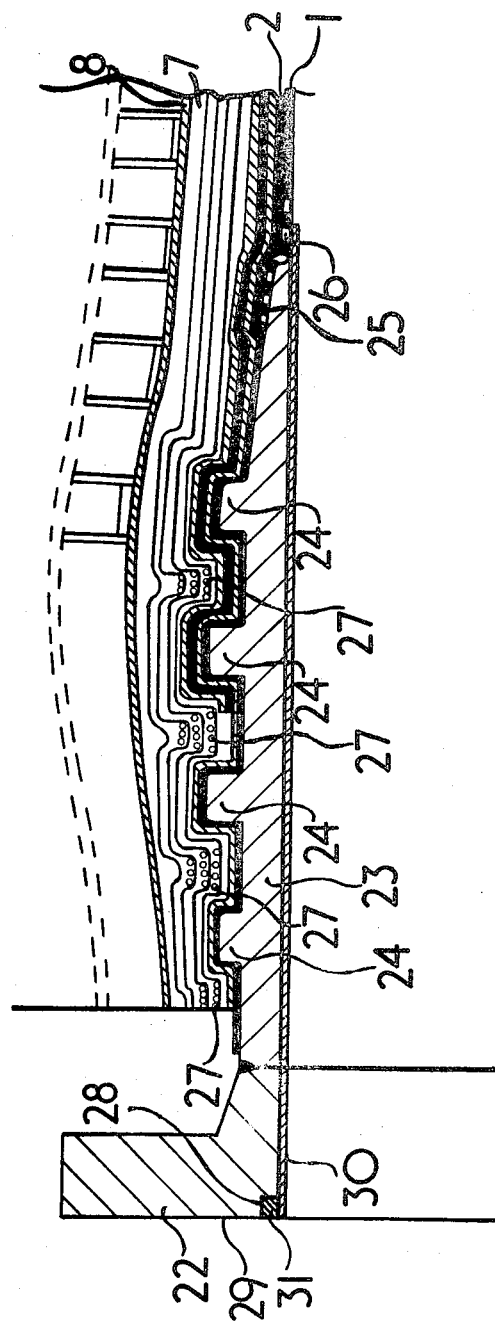
FIG. 4 is a section of the attachment of the hose of FIG. 1 to an end fitting.

Each of the hosepipes described above is generally made in lengths of approximately 30 feet for ease of handling in service. Connections between the lengths are made by means of steel flanges one at either end of each length of hose. The method of attachment of the hose to its end flanges is shown in FIG. 4.

An end fitting comprises a flange 22 butt-welded to a cylindrical nipple 23. The nipple has steel rings 24 welded to its outer diameter to provide a purchase for the hose and a tapered outer diameter at the end to give a smooth overlap for the hose material.

In the manufacture of a length of hosepipe an end fitting is positioned at either end of the assembly mandrel and a strip of fabric 26 is wrapped over the junction of the nipple and mandrel. The layers of the hose lining 1–6 are then applied as described to overlap and rest between the rings 24 on the nipple 23.

The layers of textile reinforcement 7 also overlap the rings but, after applying each layer, steel wire 27 is wound around the assembly to force the reinforcement and underlying layers into the gaps between the rings. The rest of the assembly is then as described above.

For heavy duty use the nipple 23 may be provided with a replaceable liner 30 as shown in FIG. 4. The internal bore of the nipple is machined slightly large (about ¼ inch larger in diameter) than the final required bore and a stepped diameter 28 is machined in the jointing flange face 29. The replaceable liner 30 takes the form of a steel lining tube of about ⅛ inch wall thickness having a ring 31 welded to it at one end, the ring being of a diameter to engage the stepped diameter 28, and being about 1 inch longer than the nipple is positioned inside the nipple. This lining tube 30 provides a replaceable wear member for protecting the nipple and the overlap of approximately 1 inch protects the vulnerable joint between the hose and nipple.

The lining tube 30 may be of any suitable material for the material being passed down the tube. Hard steels such as manganese steel are suitable as are normal steel and abrasion-resistant plastics materials.

Hose lengths, having end fittings as described each lined by a lining tube may be interconnected in lengths and used for transporting dredged materials from the dredger to a barge or the shore. The hosepipes are abrasion and wear resistant, flexible and self-floating when required. The curvature of a hose-line may be much less than hitherto and may be as small as 10–15 feet radius. Furthermore, the flexing may occur along almost the entire length of the hose which allows greatly improved movement when wave motions cause movement of the hose and the hose can operate in wave conditions of greater height than has been found possible hitherto so that dredgers may operate over much longer periods than hitherto.

The hosepipe wears much more slowly than the steel pipes previously used but in the event of failure or damage to the hose a new length may readily be inserted by simply unbolting the flanges of the damaged section and bolting in a replacement section or by merely replacing one or more of the replaceable liners.

Having now described our invention, what we claim is:

1. A flexible hosepipe for carrying abrasive-type particulate material under pressure, comprising a first inner lining layer of hard, abrasion-resistant elastomeric material and a second layer disposed radially outwardly of the first layer, said second layer being of relatively soft resilient elastomeric material whereby the second layer cushions impacts on the first layer.

2. A flexible hosepipe according to claim 1 wherein a fabric breaker layer is provided within the first inner lining layer.

3. A flexible hosepipe according to claim 1 wherein a fabric breaker layer is provided between the first and second layers.

4. A flexible hosepipe according to claim 1 including a plurality of spaced-apart rings of cured resinous material containing reinforcement filaments, rings of elastomeric filler material disposed between the spaced-apart rings, an outer breaker ply and an outer covering layer.

5. A flexible hosepipe according to claim 4 wherein the elastomeric filler material is a cellular material to provide buoyancy for the hosepipe.

6. A flexible hosepipe as in claim 1 wherein at least one layer of cellular material is provided over spaced-apart rings to provide buoyancy for the hosepipe.

7. The flexible hosepipe of claim 1 in which the first inner lining layer has a hardness of about 75° Shore.

* * * * *